(12) United States Patent
Charrue et al.

(10) Patent No.: US 7,892,336 B2
(45) Date of Patent: Feb. 22, 2011

(54) APPARATUS AND METHOD FOR EXTRACTING GASEOUS, LIQUID AND/OR SOLID ELEMENTS FROM A GASEOUS MEDIUM AND CONCENTRATING THEM IN A LIQUID MEDIUM

(75) Inventors: Pierre Charrue, Monts (FR); Gilles Thevenot, Montbazon (FR); Goulven Cavalin, Govesman (FR); Roger Delmas, Plougastel-Daoulas (FR)

(73) Assignee: Commissariat A L'Energie Atomique, Paris (FR)

( * ) Notice: Subject to any disclaimer, the term of this patent is extended or adjusted under 35 U.S.C. 154(b) by 870 days.

(21) Appl. No.: 10/561,593

(22) PCT Filed: Sep. 1, 2004

(86) PCT No.: PCT/FR2004/050408

§ 371 (c)(1),
(2), (4) Date: May 7, 2007

(87) PCT Pub. No.: WO2005/025721

PCT Pub. Date: Mar. 24, 2005

(65) Prior Publication Data

US 2008/0017033 A1    Jan. 24, 2008

(30) Foreign Application Priority Data

Sep. 4, 2003    (FR) .................................... 03 50500

(51) Int. Cl.
*B01D 47/00*    (2006.01)

(52) U.S. Cl. ................ 96/256; 261/78.1; 261/DIG. 65; 55/315.1

(58) Field of Classification Search ................ 55/315.1; 95/187, 228; 96/256; 261/78.1, DIG. 65
See application file for complete search history.

(56) References Cited

U.S. PATENT DOCUMENTS 2,009,664 A * 7/1935 James ......................... 568/953
4,208,912 A   6/1980 Baldeck

OTHER PUBLICATIONS

Talbot, R.W., et al., Measuring Tropospheric $HNO_3$: Problems and Prospects for Nylon Filter and Mist Chamber Techniques, Journal of Geophysical Research, 1990, pp. 7553-7561, vol. 95, Hampton, Virginia.

(Continued)

*Primary Examiner*—Robert A Hopkins
(74) *Attorney, Agent, or Firm*—McKenna Long & Aldridge LLP (57) ABSTRACT

The invention relates to an apparatus and to a method for extracting elements from a gaseous medium and concentrating them in a liquid medium, by nebulizing this liquid medium by means of the gaseous medium and condensing the mist produced by this nebulization. This apparatus comprises a first enclosure for nebulization and condensation, intended to contain the liquid medium, which is provided with a conduit for delivering the gaseous medium, means for nebulizing the liquid medium, and a conduit for discharging the gaseous medium, means for depressurizing or pressurizing the interior of the first enclosure, and is characterized in that it comprises a second enclosure for condensation and means for cooling this second enclosure.

20 Claims, 3 Drawing Sheets

OTHER PUBLICATIONS

Talbot, R.W., et al., Carboxylic Acids in the Rural Continental Atmosphere Over the Eastern United States During the Shenandoah Cloud and Photochemistry Experiement, Journal of Geophysical Research, 1995, pp. 9335-9343, vol. 100.

Keene, W. C., Measurement Technique for Inorganic Chlorine Gases in the Marine Boundary Layer, Environ. Sci. Technol., 1993, pp. 866-874, vol. 27, No. 5, Miami, Florida.

* cited by examiner

APPARATUS AND METHOD FOR EXTRACTING GASEOUS, LIQUID AND/OR SOLID ELEMENTS FROM A GASEOUS MEDIUM AND CONCENTRATING THEM IN A LIQUID MEDIUM

This application claims priority to International Application No. PCT/FR2004/050408, filed on Sep. 1, 2004, and French Patent Application No. 03 50500, filed Sep. 4, 2003, which are hereby incorporated by reference in their entirety.

TECHNICAL FIELD

The present invention relates to an apparatus and to a method for extracting elements liable to be present in a gaseous medium and concentrating them in a liquid medium, and of doing so irrespective of whether the elements are gaseous, liquid or solid, of chemical or biological nature, and whether or not they are soluble in water.

This apparatus and this method may therefore be employed in any fields in which it is desirable to detect or quantitatively determine elements liable to be present in a gaseous, liquid or solid form in a gaseous environment, such as combustion gases ($CO$, $CO_2$, $SO_2$, $NO_x$, etc.), volatile organic compounds (VOC: hexane, heptane and other alkanes; benzene, toluene, xylenes and other light aromatic compounds; acetone, monoethyl ketone and other ketones; formaldehyde, acetaldehyde and other aldehydes; perchloroethylene, trichloroethylene and other chlorinated hydrocarbons; chlorofluorocarbons, etc.), polycyclic aromatic hydrocarbons (PAC: benzo(a)pyrene, coronene, naphthalene, etc.), heavy metals (lead, mercury, arsenic, etc.), radioactive contaminants or biological contaminants (microorganisms, pollens).

In particular, they may be used for controlling and monitoring atmospheric pollution and the quality of more less confined spaces both industrially, for example in order to check the cleanliness of production lines and the emissions associated with this production, and in communal places (hospitals, educational establishments, sports halls or auditoria, etc.) or even private property (office blocks or residential buildings).

PRIOR ART

In order to analyze the elements present in a gaseous medium, and especially atmospheric pollutants, many types of apparatus have hitherto been proposed which may be broadly classified in two categories.

On the one hand, there are types of apparatus which make it possible to carry out an online analysis and which are used as warning systems, for example in the scope of continuous atmospheric pollution monitoring.

These types of apparatus generally use analysis techniques based on a physical property of the elements to be analyzed, such as refractive index, thermal conductivity or infrared absorbance. They are therefore calibrated only for a single family of elements, or even a single element, and they consequently only provide analysis limited to this single family or this single element.

There are on the other hand types of apparatus which make it possible to extract from the gaseous medium the elements which it contains, and concentrate them, these elements being identified and quantitatively determined secondarily either by an analysis system (for example a chromatograph) coupled to the extraction-concentration apparatus, or in a laboratory. The following are known in particular:

types of apparatus which collect the elements present in a gaseous medium by filtering a flow of this gaseous medium on a solid filter (for example, a filter made of nylon or Teflon®), which have the major drawback of not retaining elements whose size is less than the pore width of the filter;

types of apparatus which fix the elements present in the gaseous medium on a solid phase (for example charcoal) by adsorption;

types of apparatus which collect the elements present in the gaseous medium in a liquid, by diverting a flow of this gaseous medium into this liquid and separating the elements by inertia, but which also do not make it possible to extract the elements of small size;

types of apparatus which transfer the elements present in the gaseous medium to a liquid by making a flow of this gaseous medium pass through a tube which is filled with this liquid and which is closed at its two ends by a membrane permeable only to gases (reference [1]); these types of apparatus therefore have the weakness of extracting from the gaseous medium only the gaseous elements which it contains (since the liquid and solid elements are retained outside the tube) and by contact between the gaseous medium and the liquid which is insufficient to ensure reliability of this extraction; and types of apparatus which also transfer the elements present in the gaseous medium to a liquid, but by nebulizing this liquid by means of a flow of this gaseous medium.

The technique of extraction-concentration by nebulization, more commonly referred to as the "mist chamber technique", was proposed for the first time in 1985 with a view to analyzing water-soluble gases present at trace levels in the atmosphere.

In an enclosure through which a continuous flow of the gaseous medium travels from the bottom upwards and which contains water in its bottom part, this technique consists in bringing this water in contact with the gas flow so as to convert it into a mist consisting of fine droplets of water suspended in the gaseous medium, so as to obtain a large interaction surface area between this medium and the water which is conducive to promoting transfer of the water-soluble gases from one to the other. At the same time, the water droplets condense on the wall of the enclosure by coalescence and the drops thus formed flow along this wall towards the bottom part of the enclosure. They hence make it possible to supply the bottom part of the enclosure with water and, therefore, to nebulize this water continuously and thus progressively enrich it with water-soluble gases.

In view of its principle, in the almost 20 years of its existence, the technique of extraction-concentration by nebulization has been used exclusively for extracting from a gaseous medium, and concentrating, elements capable of dissolving in water or in an aqueous solution, these elements being identified and quantitatively determined secondarily, generally by ion chromatography.

For example, Talbot et al. use it with a view to measuring the tropospheric concentration of nitric acid (reference [2]) or of formic acid, acetic acid and pyruvic acid (reference [3]), whereas Keene et al. use it for quantitatively determining the inorganic gases containing chlorine which are present in sea air (reference [4]) by using an alkaline aqueous solution in order to extract and concentrate $Cl_2$ and an HOCl fraction, and an acidic aqueous solution in order to extract and concentrate HCl, NOCl, $ClNO_2$ and $ClNO_3$.

It is apparent from the above that all the types of apparatus proposed to date for the analysis of elements found in a gaseous medium have their usefulness limited, on the one hand, to one type of analysis which either is immediate or is offline, and on the other hand to one type of element, with these elements having to comply with either a certain size or a certain state (for example the gaseous state), or certain physicochemical properties (for example solubility in water), in order to be included in the analysis.

Especially for controlling and monitoring atmospheric pollution, it would nevertheless seem desirable to provide apparatus which is versatile, particularly in so far as it makes it possible:

to carry out both an exhaustive analysis of the gaseous, solid and liquid elements contained in the gaseous medium and an analysis targeted at a family of elements, or even one element in this family; and to carry out this analysis equally well online, so it can be used as a warning system, and offline.

It would moreover be desirable for this apparatus to be usable irrespective of the place where the gaseous medium to be analyzed is found, by virtue of being easy to transport and autonomous.

The invention relates specifically to an apparatus which makes it possible to extract gaseous, liquid and/or solid elements from the gaseous medium in which they are found and to concentrate these elements in a liquid medium, by nebulizing this liquid medium by means of the gaseous medium and condensing the droplets of liquid medium forming the mist produced by this nebulization, and which satisfies all these requirements.

SUMMARY OF THE INVENTION

The apparatus according to the invention comprises:

a first enclosure for nebulization and condensation, which has an upper part and a lower part intended to contain the liquid medium, and which is provided with a conduit for delivering the gaseous medium, means for nebulizing the liquid medium, and a first conduit for discharging the gaseous medium;

means for depressurizing or pressurizing the interior of the first enclosure to allow the gaseous medium to enter this first enclosure, circulate therein and be discharged therefrom, in a continuous flow; and it is characterized in that it furthermore comprises:

at least one second enclosure for condensation, this second enclosure being connected to the conduit for discharging the gaseous medium from the first enclosure, and being provided with a second conduit for discharging the gaseous medium; and means for cooling this second enclosure.

The apparatus according to the invention thus has the characteristic of comprising at least two separate enclosures:

a first enclosure which, when the apparatus is operational, is intended to be used both for nebulizing the liquid medium by the gaseous medium so as to obtain a mist formed by fine droplets of this liquid medium suspended in the gaseous medium, and for condensing some of these droplets by coalescence of said droplets on a wetted surface; and a second enclosure which is connected to the first enclosure while being located downstream of it with respect to the direction in which the gas flow travels, which is refrigerated and which for its part is used for condensing the liquid medium droplets which have not been condensed in the first enclosure, this complementary condensation be obtained by contact of these droplets with a cold surface.

Owing to this double condensation, the apparatus according to the invention offers the possibility of extracting the gaseous, liquid and/or solid elements present in a gaseous medium and concentrating them in a liquid medium by the technique of extraction-concentration by nebulization, but by using not only water or an aqueous solution as the liquid medium but also an organic solvent, a mixture of organic solvents forming an azeotrope or even a mixture of water/organic solvent(s) forming an azeotrope, and doing so without the risk that some of this or these organic solvents will be lost by evaporation during the extraction-concentration, the effect of which would be to falsify the analysis results for these elements.

The apparatus according to the invention thus makes it possible to employ a liquid medium which is perfectly suited to the solubility properties of the elements which are present in the gaseous medium, and which are intended to be detected or quantitatively determined, and to carry out both a targeted extraction-concentration, i.e. one limited for example just to the elements which are water-soluble or conversely to those which are insoluble or not very soluble in water, and an exhaustive extraction-concentration of the elements found in the gaseous medium.

The solvent or solvents forming the liquid medium may be selected from a large number of solvents, so long as they satisfy the following conditions: not having a high vapour pressure in order to facilitate their condensation; being free of any contamination by elements identical to those which are intended to be analyzed; and, when they are intended to be used as a mixture, being miscible with one another so that the liquid medium is homogeneous, and forming an azeotrope.

For the sake of convenience, in what follows:

the condensation of the droplets or some of the droplets forming the mist produced by the nebulization is more simply referred to as condensation of the mist or some of the mist;

the condensation resulting from the coalescence of these droplets on a wetted surface is more simply referred to as condensation by coalescence, whereas the condensation resulting from the contact of the said droplets with a cold surface is more simply referred to as thermal condensation.

According to the invention, the gaseous medium delivery conduit of the first enclosure having a first end located outside this first enclosure and a second end housed in this first enclosure, the means for nebulizing the liquid medium comprise:

a nebulization nozzle which is located level with the second end of this conduit and which has at least one orifice; and a nebulization tube provided with two openings: a first opening which is located in the lower part of the first enclosure, and a second opening which is flush with the orifice of the nebulization nozzle.

In the context of the present invention, the term nebulization nozzle is intended to mean any element which has at least one orifice and which when the apparatus is operational, by being located level with the second end of the gaseous medium delivery conduit of the first enclosure, can increase the velocity with which the gas flow is released into the first enclosure compared to the velocity with which it flows in the part of the conduit located upstream of this element, so as to induce Venturi-effect suction into the nebulization tube of the liquid medium located in the lower part of the first enclosure, and release of this liquid medium through a second opening which this tube includes and which is flush with the orifice of said element.

According to the invention, the nebulization nozzle may be formed by a progressive reduction in the cross section of the gaseous medium delivery conduit of the first enclosure or by a sequential reduction in this cross section, for example a series of constrictions.

As a variant, it may also consist of a piece attached to the second end of the gaseous medium delivery conduit of the first enclosure, for example by screwing or snap-fastening. In this case, the apparatus may be equipped with a set of interchangeable nozzles which differ from one another by the number of orifices and/or the size of these orifices, and which make it possible to optimally match the exit velocity of the gas flow into the first enclosure to the viscosity of the liquid medium, and thus to optimize the Venturi effect.

In a first preferred embodiment of the apparatus according to the invention, the orifice of the nebulization nozzle is oriented towards the upper part of the first enclosure, and the second opening of the nebulization tube is located immediately above this orifice.

In this first embodiment, the first enclosure is preferably composed of three parts:
 a reservoir which forms the lower part of the first enclosure and which is intended to contain the liquid medium;
 a nebulization chamber which forms the intermediate part of the first enclosure and which houses the orifice of the nebulization nozzle and the second opening of the nebulization tube; and
 a condensation dome which forms the upper part of the first enclosure.

Furthermore, the second enclosure having a base and a top, the first conduit for discharging the gaseous medium is preferably a conduit with a bend which connects the nebulization chamber of the first enclosure to the base of the second enclosure, so that the vertical axis of the second enclosure is significantly offset relative to the vertical axis of the first enclosure. Ideally, the junction between this conduit and the nebulization chamber lies substantially at the same height as, or at a height lower than that where the orifice of the nebulization nozzle and the orifice of the nebulization tube lie.

When the apparatus is operational, release of the liquid medium just above the orifice of the nebulization nozzle—which itself releases the gaseous medium in the form of a flow—thus generates the formation of a mist formed by fine droplets of liquid medium suspended in the gaseous medium in the nebulization chamber of the first enclosure, which, by ensuring intimate contact between the liquid medium and the gaseous medium, allows the gaseous, liquid and/or solid elements present in this gaseous medium to dissolve in the liquid medium and thus be transferred from the said gaseous medium to the said liquid medium.

In view of the orientation of the nebulization nozzle, this mist rises towards the condensation dome when it partially condenses by coalescence, the wetted surface in this case being the wall of the condensation dome. Drops thus form on the wall of this dome and then flow under gravity along this wall until they reach the reservoir forming the lower part of the first enclosure.

At the same time, owing to the depressurization or pressurization which prevails in the first enclosure (and consequently in the second enclosure, since they are connected to each other), the mist which has not condensed in the first enclosure escapes therefrom through the first conduit for discharging the gaseous medium and enters the second enclosure, where it experiences thermal condensation. Here again, this condensation entails the formation of drops which flow under gravity into the first conduit for discharging the gaseous medium, then along the portion of the wall the first enclosure which separates this conduit from the reservoir of this first enclosure, and rejoin this reservoir.

As the liquid medium contained in the reservoir of the first enclosure is being nebulized, this reservoir is thus supplied with liquid medium both by the drops which are formed in the condensation dome of the first enclosure and by those which are formed in the second enclosure, which makes it possible for the nebulization to be carried out continuously and for the gaseous, liquid and solid elements initially present in the gaseous medium to be concentrated progressively in the liquid medium, for as long as desired.

Furthermore, the "offset" arrangement of the second enclosure with respect to the first enclosure makes it possible to reduce the velocity of the droplets formed by the nebulization; these droplets therefore circulate at a lower velocity in the second enclosure, which makes it possible to avoid ejecting them directly from this enclosure, increase their contact times with the cold parts of the second enclosure, and thereby improve the condensation of the mist in the said second enclosure.

In a second preferred embodiment of the apparatus according to the invention, the orifice of the nebulization nozzle is oriented towards the lower part of the first enclosure, and the second opening of the nebulization tube is located immediately below this orifice.

In a second preferred embodiment of the apparatus according to the invention, the first enclosure is preferably composed of two parts:
 a reservoir which forms the lower part of this first enclosure and which is intended to contain the liquid medium, which reservoir has a bottom whose surface area is less than a cross section of this reservoir, this cross section being flush with the surface of the liquid medium when the apparatus is operational; and
 a nebulization chamber which forms the upper part of the apparatus and which houses the orifice of the nebulization nozzle and the second opening of the nebulization tube.

More particularly, it is preferable for the reservoir to have a shape which tapers from the bottom upwards, for example a frustoconical shape.

In this second preferred embodiment, the nebulization chamber advantageously has two walls: an outer wall onto which the first conduit for discharging the gaseous medium is to be connected, and an inner wall which is located entirely above and at a distance from the reservoir, this inner wall dividing the nebulization chamber in order to form a central part located inside the inner wall and a peripheral part located between the outer wall and the inner wall, the second opening of the nebulization tube and the orifice of the nebulization nozzle being housed in the said central part.

Furthermore, the second enclosure having a base and a top, the first conduit for discharging the gaseous medium is a conduit with a bend which connects the nebulization chamber of the first enclosure to the base of the second enclosure, so that here again the vertical axis of the second enclosure is significantly offset relative to the vertical axis of the first enclosure. Ideally, the junction between this conduit and the nebulization chamber lies substantially at the same height as, or at a height higher than that where the orifice of the nebulization nozzle and the orifice of the nebulization tube lie.

When the apparatus is operational, the mist produced by release of the liquid medium just below the orifice of the nebulization nozzle is thus created in the central part of the nebulization chamber of the first enclosure.

In view of the orientation of the nebulization nozzle, this mist descends towards the reservoir where it partially condenses by coalescence, the wetted surface in this case being essentially the surface of the liquid medium contained in this reservoir.

At the same time, owing to the depressurization or pressurization which prevails in the first enclosure, the mist which has not condensed rises into the peripheral part of the nebulization chamber and escapes therefrom through the first conduit for discharging the gaseous medium, before entering the second enclosure where it experiences thermal condensation as described above.

The reservoir of the first enclosure is thus supplied continuously with liquid medium, both by the drops which are formed on the surface of the liquid medium contained in this reservoir and by those which are formed in the second enclosure.

Advantageously, the first enclosure comprises an element for stabilizing the surface of the liquid medium, which is intended to lie below and at a short distance (a few mm) from this surface when the apparatus is operational—this distance should be optimized according to the nature of the liquid medium—while allowing the drops due to the condensation of the mist to pass though.

In order to achieve this, the stabilizing element is for example a rigid element of small thickness, such as a mesh consisting of or coated with a material which is inert with respect to the elements liable to be extracted from the gaseous medium and which can withstand the possible corrosive effects of these elements and the organic solvents, such as polyethylene or Teflon®, which has a cross section substantially smaller than the cross section of the reservoir flush with the surface of the liquid medium when the apparatus is operational, and which is optionally provided with elements such as floats for keeping it at the same distance from this surface irrespective of the height variations to which it is subjected when the apparatus is being used.

Whatever the embodiment of the apparatus according to the invention, the means for cooling the second enclosure are preferably a Peltier effect cell, since such a cell makes it possible to ensure very efficient cooling without using fluorocarbon gases such as Freon®.

Nevertheless, it is of course possible to cool the enclosure by other refrigerating systems, in particular by a system in which a refrigerant is compressed.

According to the invention, the second enclosure may be empty, in which case the cold surface on which the mist can condense is at most the surface area of the wall of this enclosure. It is also preferable for the second enclosure to contain packing.

In the context of the present invention, the term packing means a set of elements consisting of or coated with a material which is inert with respect to the elements liable to be extracted from the gaseous medium and which can withstand the possible corrosive effects of these elements and the organic solvents, which, once placed in the second enclosure, has the effect of increasing the cold surface on which the mist can condense when the apparatus is operational, thereby optimizing the condensation of this mist. Such packing consists, for example, of Teflon® beads, stainless steel beads or Raschig rings.

Preferably, the lower part of the first enclosure is provided with at least one system for detecting or quantitatively determining the gaseous, liquid and/or solid elements extracted from the gaseous medium and concentrated in the liquid medium when the apparatus is operational.

This is because the presence of such a system offers the opportunity to identify or quantitatively determine the elements present in the gaseous medium both as they are being extracted from this medium and concentrated in the liquid medium, and at the end of the operation of extracting-concentrating these elements.

In the latter case, furthermore, the elements may be analyzed by using either the detection and quantitative determination system of the apparatus, or the services of an analysis laboratory after having collected the liquid medium or even both, for example in the event that it is desirable for the results obtained with the apparatus to be checked by an analysis laboratory.

The apparatus according to the invention is therefore perfectly suitable for use as a warning system if so desired, for example in order to control and monitor atmospheric pollution. In other cases, it makes it possible to minimize the time necessary for carrying out analyses of elements present in the gaseous medium.

This detection or measurement system may, in particular, consist of:

an optical detector consisting of a diode and a photoelectric cell, for emitting and analyzing a light beam with a given wavelength which passes through the lower part of the first enclosure by virtue of two windows which includes;

a spectrophotometer or a spectrofluorimeter connected to the two windows of the vessel by two optical fibres; or alternatively an electrochemical probe immersed in the lower part of the first enclosure;

these various means being combinable.

In order to facilitate collection of the liquid medium at the end of an extraction-concentration operation, the lower part of the first enclosure is preferably removable.

More generally, the first enclosure and the second enclosure can be dismantled, and their constituent parts are connected together in a leaktight fashion when these enclosures are assembled, for example by screwing, snap-fastening, interlocking or the like. This connection may be carried out using means integrated in the said parts (for example screw threads in the case of screw assembly) or conversely using means attached to them, such as connectors or clamping rings. For its part, the leaktightness is obtained by the presence of seals in the connection regions, such as Teflon® O-ring seals.

The benefit is that this arrangement makes it easy to clean the wall the first enclosure and/or the wall of the second enclosure and the various elements which are housed in these enclosures, between two extraction-concentration operations, and thereby to eliminate any risk of contaminating the liquid medium being used during an extraction-concentration operation by residual traces of elements which were extracted and concentrated during a previous extraction-concentration operation, such contamination being liable to compromise the validity of the analysis results.

According to the invention, the apparatus preferably comprises means for depressurizing the interior of the first enclosure, which are preferably a positive-displacement suction pump connected to the second conduit for discharging the gaseous medium.

It is furthermore provided with an electrical power supply system, which advantageously comprises both means for connection to an external electrical power source (electricity mains, external batteries, etc.), for instance a connection cable, and its own electrical power supply means allowing it to operate autonomously, for example batteries, rechargeable accumulators or the like.

In a particularly preferred embodiment of the apparatus according to the invention, it is in the form of a compact structure which can be carried or pulled by a single person, such as a rucksack, suitcase or briefcase allowing it to be transported and used wherever the gaseous medium to be analyzed is found.

Besides the advantages mentioned above, the apparatus according to the invention also has a number of other advantages, in particular that it makes it possible to carry out very high-performance analyses especially in terms of sensitivity, it is simple to use, and it can be produced in a compact and autonomous form if so desired, allowing it to be transported and used on any type site.

The invention also relates to a method for extracting gaseous, liquid and/or solid elements from a gaseous medium and concentrating them in a liquid medium, by nebulizing this liquid medium by means of the gaseous medium and condensing the droplets of liquid medium forming the mist produced by this nebulization, which method is characterized in that said droplets are subjected to a condensation by coalescence on a wetted surface and to a condensation by contact with a cold surface.

According to the invention, the condensation of the droplets by coalescence on a wetted surface and the condensation of the droplets by contact with a cold surface are preferably carried out in two enclosures which are separate from each other but are connected together.

Particularly preferably, the condensation of the droplets by contact with a cold surface is carried out in a refrigerated enclosure which contains packing.

According to the invention, the liquid medium comprises one or more solvents selected from water, organic solvents and mixtures thereof.

Besides the arrangements described above, the invention also encompasses other arrangements which will be found in the rest of the description which follows, relating to exemplary embodiments of an extraction-concentration apparatus according to the invention and referring to the appended drawings.

It is nevertheless clear that this remaining description is given merely in order to illustrate the subject-matter of the invention, and in no way constitutes a limitation of this subject-matter.

DETAILED DESCRIPTION OF EXEMPLARY EMBODIMENTS OF AN APPARATUS ACCORDING TO THE INVENTION

Figure 1:
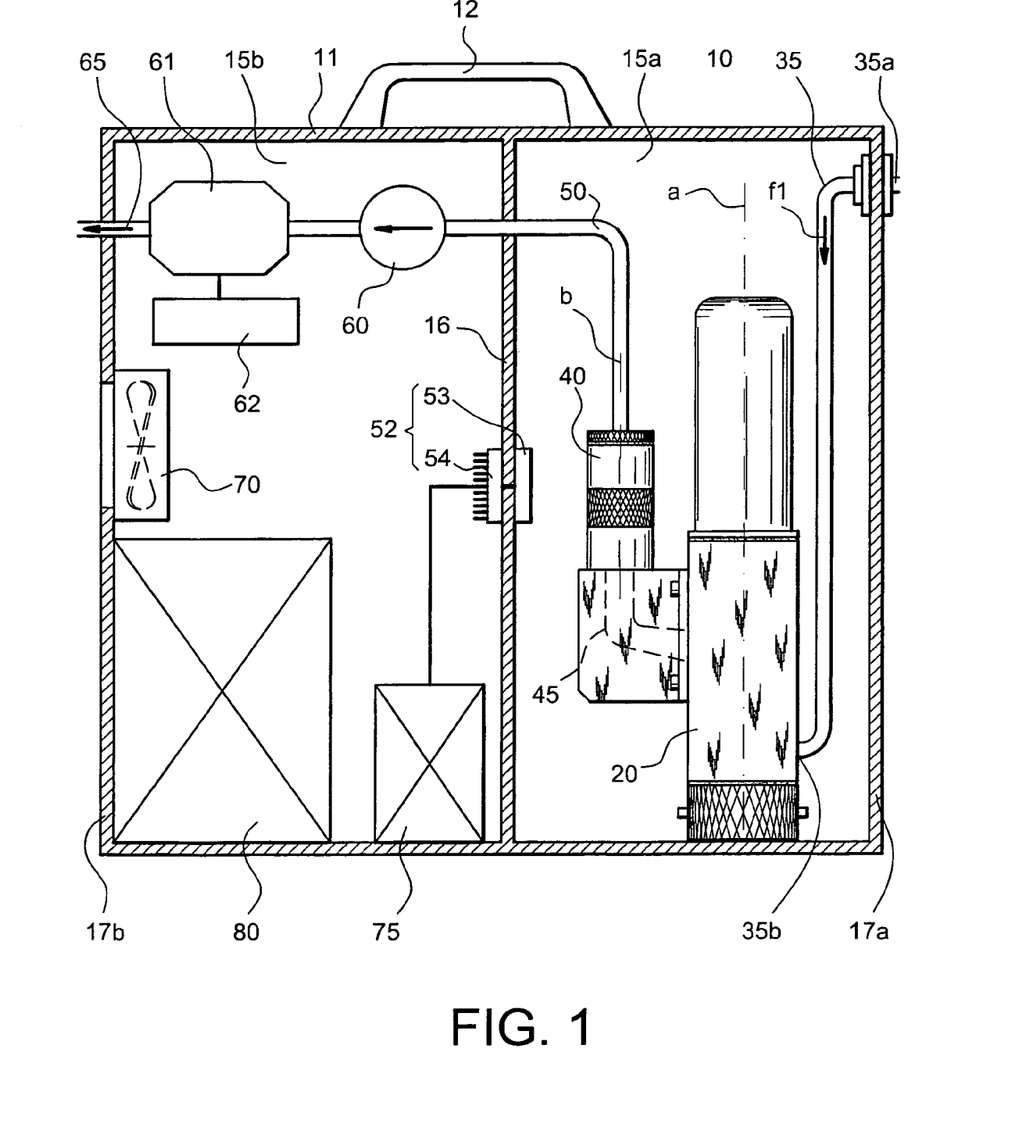
FIG. 1 is an summarized diagram of an exemplary embodiment of an extraction-concentration apparatus according to the invention, in which it is in a compact form suitable for being carried by a single person.

Reference will first be made to FIG. 1, which corresponds to an outline diagram of an exemplary embodiment of an extraction-concentration apparatus according to the invention, in which the latter is in a compact form, or more precisely in the form of a briefcase 11 intended to be carried by a single person using a handle 12 which it has on its upper outer face.

As can be seen in this figure, the interior of the briefcase 11, which may consist of a light metal such as an aluminium-based alloy or a rigid plastic such as polypropylene, is divided into two compartments 15a and 15b, respectively, by a vertical partition 16.

The compartment 15a contains:
a first enclosure 20 with a vertical long axis a, which is intended both for nebulizing a suitable liquid medium selected according to the gaseous, liquid and/or solid elements intended to be extracted from the gaseous medium and concentrated, and for condensing some of the mist thus formed by coalescence;
a conduit 35 which is used to convey the gaseous medium into the first enclosure 20 and which, in order to do so, has an end 35a which is located outside the briefcase 11 and an end 35b which is located in the first enclosure 20;
a second enclosure 40, also with a vertical long axis b, the function of which is to thermally condense the mist which has not condensed in the first enclosure;
a duct 45 which connects the enclosures 20 and 40 together and which is used, in particular, to discharge the gaseous medium from the first enclosure 20; and
a conduit 50 which is used to discharge the gaseous medium from the second enclosure 40 and which, in order to do so, connects this enclosure to a suction pump 60 located in the compartment 15b by crossing the partition 16.

The compartment 15a also contains a device whose function is to cool the second enclosure 20 so that the internal temperature of this enclosure is, for example, of the order of 5 to 10° C. if the ambient temperature is 25° C.

In the embodiment illustrated in FIG. 1, this device is a Peltier effect cell 52 whose face 53 intended to act as a cold face when the apparatus 10 is operational is in contact with the partition 16 and is turned towards the inside of the compartment 15a, whereas the face 54 intended to act as a hot face lies in the compartment 15b.

In certain configurations, in particular for the use of light solvents, a thermal bridge may be established between the cold face 53 of the Peltier effect cell and the second enclosure 40 with the aid of a block of a thermally conductive material, for example made of copper (not shown in FIG. 1).

In order to increase the efficiency of this cell, the walls of the compartment 15a are advantageously covered with a material (not shown in FIG. 1) which can provide thermal insulation of this compartment, for example a polyurethane foam.

For its part, the compartment 15b contains:
the suction pump 60, which is preferably a positive-displacement pump, the function of which is to depressurize the interior of the enclosures 20 and 40 and thus to allow the gaseous medium to enter these enclosures, circulate therein and be discharged therefrom in a continuous flow;
a conduit 65, the function of which is to discharge the gaseous medium from the briefcase 11 and which, in order to do so, connects the suction pump 60 to the outside of the briefcase 11 by crossing its side wall 17b;
a flow meter 61 coupled to the suction pump 60, which is used to measure the rate of the gas flow passing through the enclosures 20 and 40;
a counter 62 which is coupled to the flow meter 61 and which, by converting the instantaneous flow rate values measured by the latter into cumulative values, makes it possible to ascertain the volume of gaseous medium processed over a given period of time;
a fan unit 70 which is used to remove, from the compartment 15b, the heat released into this compartment by the hot face of the Peltier effect cell 52;

programmed electronic circuits (not shown in FIG. 1), which are managed by a monitoring and control unit 75 for driving and regulating the operation of the apparatus 10; and an electrical power supply system 80 which is intended to supply the Peltier effect cell 52, the suction pump 60, the flow meter 61, the counter 62, the fan unit 70, the programmed electronic circuits and the central monitoring and control unit 75, this supply system advantageously comprising means for connecting the apparatus to an electricity network or to external batteries, for instance a connection cable, and on the other hand means such as batteries, rechargeable accumulators or the like, allowing it to operate autonomously.

Figure 2:
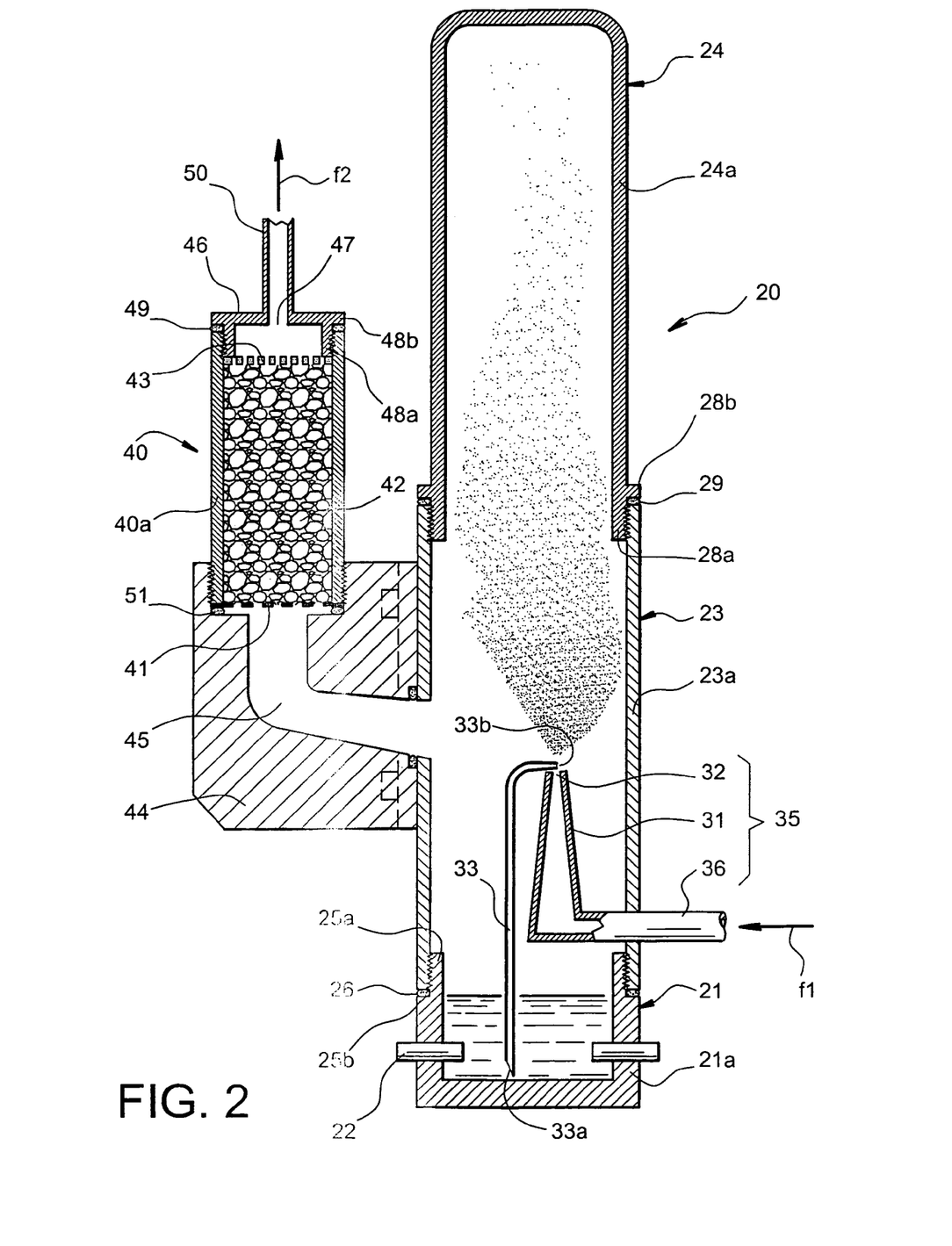
FIG. 2 is a schematic representation of a part of the apparatus shown in FIG. 1, seen in cross section.

Reference will now be made to FIG. 2, which schematically represents the elements of the apparatus 10 which are present in the compartment 15*a*, but not including the cold face 53 of the Peltier effect cell 52.

This figure therefore shows the first enclosure 20, the conduit 35 used to convey the gaseous medium into this first enclosure, the second enclosure 40, the conduit 45 connecting the two enclosures 20 and 40, as well as the conduit 50 used for discharging the gaseous medium from the second enclosure.

As can be seen in FIG. 2, the first enclosure 20 is composed of three parts, which preferably have circular cross sections and can be dismantled and assembled whenever required by screwing. These parts are, from the bottom upwards:

a reservoir 21 which forms the lower part of this first enclosure and which, before each extraction-concentration operation, is filled with a predetermined volume of the liquid medium selected for carrying out this operation;

a nebulization chamber 23, which forms the intermediate part of this first enclosure; and a condensation dome 24, which forms the upper part of this first enclosure.

The reservoir 21, the nebulization chamber 23 and the condensation dome 24 each have a cylindrical wall, respectively 21*a*, 23*a* and 24*a*, the wall 21*a* of the reservoir 21 being closed at its lower end, whereas the wall 24*a* of the condensation dome 24 is closed at its upper end.

In its upper part, the wall 21*a* of the reservoir 21 is provided with an inner flange 25*a*, which extends upwards and whose outer surface is provided with a screw thread mating with a screw thread located on the inner surface of the wall 23*a* of the nebulization chamber 23, as well as a peripheral outer shoulder 25*b* on which the lower end of the wall 23*a* of this chamber rests. Between the shoulder 25*b* and the lower end of the wall 23*a* of the nebulization chamber 23, there is a first O-ring seal 26 suitable for ensuring leaktightness between this reservoir and this chamber.

Similarly, the wall 24*a* of the condensation dome 24 is provided in its lower part with an inner flange 28*a*, which extends downwards and whose outer surface is provided with a screw thread mating with a screw thread located on the inner surface of the wall 23*a* of the nebulization chamber 23, as well as a peripheral outer shoulder 28*b* which covers the upper end of the wall 23*a* of this chamber. A second O-ring seal 29 is placed between the shoulder 28*b* of the wall 24*a* of the condensation dome 24 and the lower end of the wall 23*a* of the nebulization chamber 23.

The reservoir 21 is provided with a detection and quantitative determination system 22 partially integrated in the thickness of its wall.

The first enclosure 20 also comprises nebulization means which comprise, on the one hand, a nebulization nozzle 31 provided with an orifice 32, the function of which is to increase the velocity with which the gaseous medium is released into the nebulization chamber 23 compared to the flow velocity of this medium in the conduit 35 when the apparatus 10 is operational, and on the other hand a nebulization pipe 33 whose function is to convey and release the liquid medium located in the reservoir 21 just above the orifice 32 of the nebulization nozzle 31.

In the exemplary embodiment shown in FIG. 2, the nebulization nozzle 31 is formed by a progressive reduction in the cross section of the conduit 35.

Furthermore, in this exemplary embodiment, this conduit comprises:

a first segment 36 (partially represented in FIG. 2) of constant cross section which, on the one hand, is connected to the outside of the briefcase 11 and, on the other hand, crosses the wall 23*a* of the nebulization chamber 23 and extends substantially as far as the central part of this chamber; and a second segment of frustoconical shape, which corresponds to the nebulization nozzle 31 and extends vertically through the nebulization chamber 23 in the direction of the condensation dome 24, its free end 32 being oriented towards this condensation dome.

The nebulization pipe 33, which has a respective opening 33*a* and 33*b* at each of its ends, is arranged vertically in the first enclosure while being curved in its upper part, so that its opening 33*a* can be immersed in the liquid medium contained in the reservoir 21 when the apparatus 10 is operational, whereas its end 33*b* lies just above the free end 32 of the nebulization nozzle 31.

The opening 33*b* has a cross section substantially smaller than that of the rest of this pipe, this difference in cross section being intended to increase the velocity with which the liquid medium is released through this opening compared to the velocity with which the same medium flows in said pipe, when the apparatus 10 is operational.

As can be seen in FIG. 2, the second enclosure 40 has a cylindrical wall 40*a* which is open at both of its ends.

Level with its lower end, the wall 40*a* is provided with a circular element 41 which extends over the entire inner cross section of the second enclosure 40 and which is pierced by a multitude of holes, for example with a diameter of from 2 to 3 mm. This element forms the base the second enclosure 40, and the holes which it includes are intended to allow the mist coming from the first enclosure 20 and the drops which are formed in the second enclosure 40, owing to the thermal condensation of this mist, to pass through when the apparatus is operational 10 while retaining the packing 42 which this second enclosure contains.

This packing is also retained in the upper part of the second enclosure 40 by a filter 43, advantageously with a pore width of between 0.2 and 0.5 μm, which offers a final condensation surface for the droplets of liquid medium which may still be present in the gaseous medium just before it leaves the second enclosure 40 through the conduit 50.

In its lower part, the second enclosure 40 is housed and held by screwing in a support block 44 enclosing the conduit 45, with this conduit specifically connecting the base the second enclosure 40 to the wall 23*a* of the nebulization chamber 23 of the first enclosure 20, substantially at the height of the orifice 32 of the nebulization nozzle 31 and the opening 33*b* of the nebulization pipe 33. A first O-ring seal 51 is arranged between the lower end of the wall 40*a* and the support block 44.

The second enclosure 40 also comprises a lid 46 which forms the top of this enclosure and which is provided with an orifice 47, level with which the conduit 50 (partially represented in FIG. 2) used to discharge the gaseous medium from the said enclosure is connected.

In its lower part, the lid 46 has an inner flange 48a extending downwards, whose outer surface carries with a screw thread mating with a screw thread located on the inner surface of the wall 40a of the second chamber 40 and whose free edge bears on the filter 43. It also has a peripheral outer shoulder 48b which covers the upper edge of the wall 40a of the second chamber 40. A second O-ring seal 49 is housed between this and the said free end.

The extraction-concentration of the gaseous, liquid and/or solid elements present in a gaseous medium by means of the apparatus 10 represented in FIGS. 1 and 2 is carried out in the following way:

After having filled the reservoir 21 with a predetermined volume of a liquid medium selected suitably according to the elements which are intended to be extracted and concentrated, having assembled this reservoir with the nebulization chamber 23 and having actuated the Peltier effect cell 52, the suction pump 60 is turned on, which has the effect of depressurizing the interior of the first enclosure 20 and the second enclosure 40 and therefore of creating an intake of the gaseous medium from the outside of the briefcase 11 into the first enclosure 20 (as illustrated by the arrow $f_1$ in FIG. 2). The gaseous medium therefore enters the nebulization chamber 23 through the conduit 35 as a continuous gas flow, the flow rate of which is regulated by means of the flow meter 61.

Owing to the joint action of the reduced pressure prevailing in the first enclosure 20 and the increase, due to the nebulization nozzle 31, of the velocity width which the gas flow is released into the nebulization chamber 23, the liquid medium contained in the reservoir 21 is sucked into the nebulization pipe 33 by the Venturi effect and released through the opening 33b which this pipe has in its upper part, just above the orifice 32 of the nebulization nozzle 31.

A mist formed by fine droplets of liquid medium suspended in the gaseous medium is thus formed in the nebulization chamber 23, which, by intimate and homogeneous contact between the liquid medium and the gaseous medium, allows the gaseous, liquid and/or solid elements present in this gaseous medium to dissolve in the liquid medium and thus be transferred from the said gaseous medium to the said liquid medium.

This mist rises towards the condensation dome 24. Some of these droplets condense by coalescence in contact with the wetted wall of the condensation dome, and form drops which flow under gravity along this wall and thus rejoin the reservoir 21.

At the same time, the mist which has not condensed in the first enclosure 20 escapes from it through the conduit 45, passes through the cylindrical element 41 and enters the second enclosure 40, where the droplets of liquid medium constituting it condense in contact with the cold surface of the packing elements 42 and the wall 40a of this second enclosure. This condensation also leads to the formation of drops which flow under gravity into the conduit 45 then along the portion of the wall 23 which separates this conduit from the reservoir 21, and rejoin this reservoir.

As the liquid medium contained in the reservoir 21 is being nebulized, this reservoir is thus supplied with liquid medium both by the drops which are formed in the condensation dome 24 and by those which are formed in the second enclosure 40, which makes it possible for the nebulization to be carried out continuously and for the gaseous, liquid and solid elements initially present in the gaseous medium to be concentrated progressively in the liquid medium, for as long as desired.

For its part, the gaseous medium leaves the second enclosure 40 through the conduit 50 (as illustrated by the arrow $f_2$ in FIG. 2) after crossing the filter 43, having been purified of the elements extracted and concentrated in the liquid medium and dried.

In order to terminate the extraction-concentration operation, it is sufficient to turn off the suction pump 61, which has the immediate effect of stopping the delivery of gaseous medium into the first enclosure 20, the Venturi effect, the intake of the liquid medium into the nebulization pipe 33 and the generation of the mist.

Figure 3:
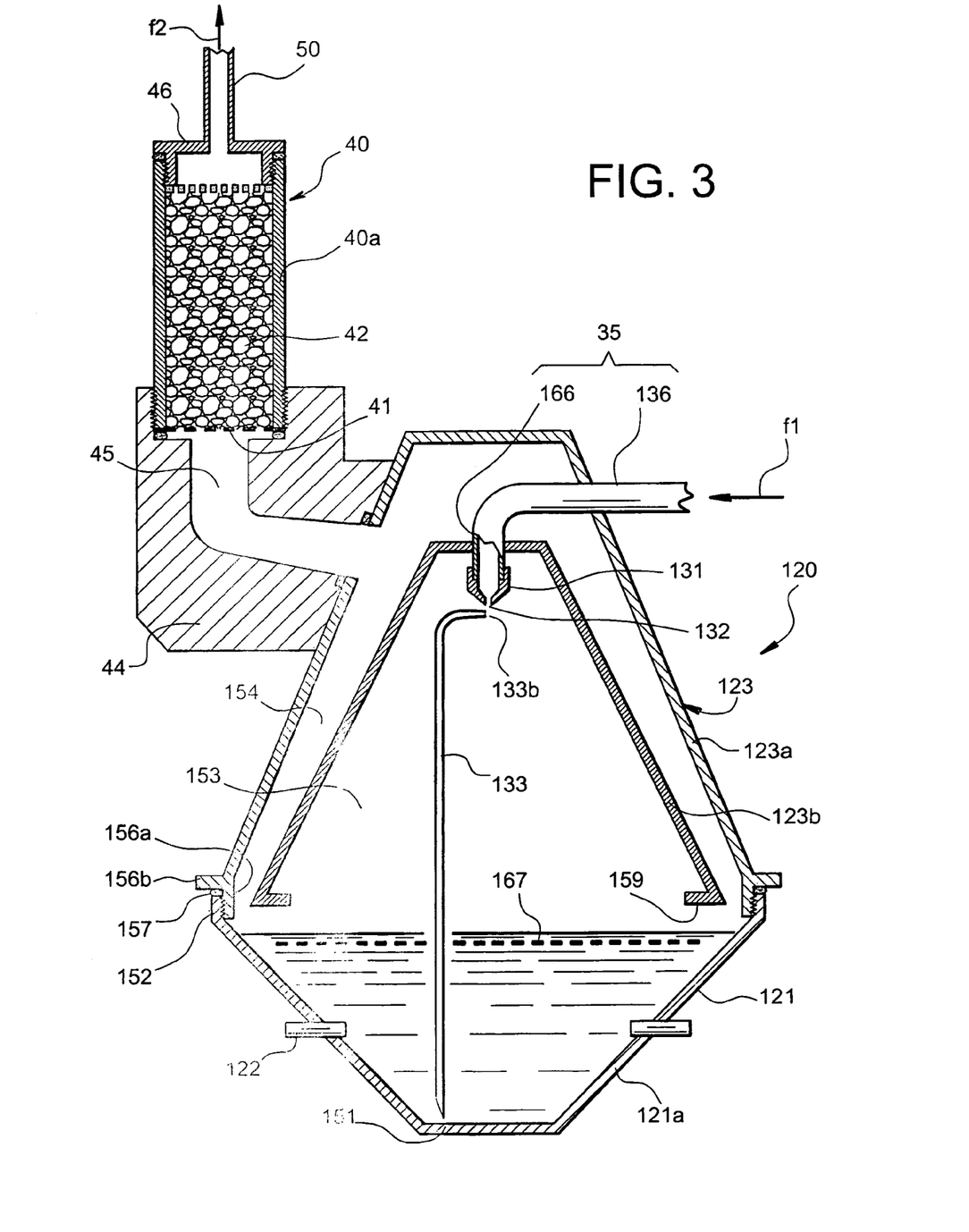
FIG. 3 is a representation of an alternative embodiment of the part of the apparatus as shown in FIG. 2, seen in cross section.

Reference will now be made to FIG. 3, which schematically represents an alternative embodiment of the part of the apparatus 10 as shown in FIG. 2, seen in cross section, which is particularly the suitable for the use of liquid media with respect to which the wall the first enclosure 20 is liable to have a low wettability.

In FIG. 3, the elements which are identical to those shown in FIG. 2 have the same references as therein.

In this alternative embodiment, the first enclosure 120 is composed of only two parts which can be dismantled and assembled whenever required by screwing. These, which preferably have a circular cross section, are:

a reservoir 121 which forms the lower part of this first enclosure; and a nebulization chamber 123 which forms its upper part.

The reservoir 121 has a wall 121a forming a conic frustum, which is closed at its lower end by a bottom 151 corresponding to the smallest cross section of this conic frustum, and in which a detection and quantitative determination system 122 is partially integrated. The wall 121a is provided with a flange 152 in its upper part.

The nebulization chamber 123 has two walls: an outer wall 123a and an inner wall 123b, each of which forms a conic frustum and both of which are closed at the upper end, this end corresponding to the smallest cross section of the said conic frustums.

The nebulization chamber 123 is thus divided into two parts: a central part 153, which is located inside the inner wall 123b, and an outer part 154 which is located between this wall and the outer wall 123a.

In its lower part, the latter is provided with an inner flange 156a which extends downwards and whose outer surface is provided with a screw thread mating with a screw thread located on the inner surface of the flange 152, which is carried by the wall 121a of the reservoir 121, as well as a peripheral outer shoulder 156b which covers the upper end of this wall 121. An O-ring seal 157, for example made of Teflon®, is arranged between this shoulder and the said end.

The lower wall 123b of the nebulization chamber 123 is provided at its lower end with a peripheral inner shoulder 159 which extends radially in the direction of the central part 153 of this chamber, at a sufficient distance from the cross section of the reservoir 121 corresponding to the surface occupied by the liquid medium, when this reservoir is filled to the maximum, in order to provide a passage between the central part 153 and the peripheral part 154 of the nebulization chamber 123 when the apparatus 10 is operational.

In the alternative embodiment illustrated in FIG. 3, the conduit 35 used for conveying the gaseous medium into the first enclosure 120 comprises two segments:

a first segment 136 (partially represented in FIG. 3) which, on the one hand, is connected to the outside of the briefcase 11 and, on the other hand, crosses the wall 123a of the nebulization chamber 123 to open above the central part 153 of this chamber, and extends substantially as far as the central part of the nebulization chamber 123; and a second segment 166 which extends vertically in the direction of the reservoir 121, crosses the inner wall of the nebulization chamber 123 to enter the central part 153 of this chamber, and ends in a nebulization nozzle 131 which is fixed by screwing, interlocking, snap-fastening, or any other means, on the free end of this segment and is provided with an orifice 132 oriented towards the reservoir.

As in the exemplary embodiment illustrated in FIG. 2, the first enclosure 120 comprises a nebulization tube 133 provided with a respective opening 133a and 133b at each of its ends. This tube is arranged vertically in the central part 153 of the nebulization chamber 123 while being curved in its upper part, so that its opening 133a can be immersed in the liquid medium contained in the reservoir 121 when the apparatus is operational, whereas its end 133b lies just below the orifice 132 of the nebulization nozzle 31. Here again, the opening 133b has a cross section substantially smaller than that of the rest of this pipe.

As can be seen in FIG. 3, the first enclosure 120 has a mesh 167 through which are the nebulization pipe 133 passes. This mesh, the openings of which advantageously measure from 0.05 to 0.5 mm, is intended to stabilize the surface of the liquid medium when the apparatus is operational, in particular by preventing the gas flow released through the orifice 132 of the nebulization nozzle 131 from creating turbulence at the surface of this liquid medium.

In order to do so, it is expedient for this mesh to lie a few mm below the surface of the liquid medium and for the distance separating it from this surface to remain constant when, after the apparatus 10 has been put into operation, this surface descends as a result of the nebulization. The mesh 167 therefore has a cross section which is substantially smaller than the cross section of the reservoir 121 flush with the surface of the liquid medium when the apparatus 10 is operational, and it is provided with one or more floats (not shown in FIG. 3) which allow it to be kept at a constant distance from the surface of the liquid medium.

In the alternative embodiment represented in FIG. 3, the conduit 45 for discharging the gaseous medium and the second enclosure 40 are identical to those described with reference to FIG. 2, except for the fact that the conduit 45 is connected level with the upper part of the first enclosure 120 rather than level with its intermediate part.

The same procedure as described above is adopted in order to carry out extraction-concentration of gaseous, liquid and structural solid elements present in the gaseous medium by means of the alternative embodiment illustrated in FIG. 3.

In this case, the mist is merely formed at the top of the central part 153 of the nebulization chamber 123 of the first enclosure 120, and descends towards the reservoir 121 where some of the droplets of liquid medium constituting it condense by coalescence in contact with the surface of the liquid medium contained in this reservoir.

At the same time, the mist which has not condensed in contact with the surface escapes into the peripheral part 154 of the nebulization chamber 123 through the passage existing between the peripheral inner shoulder 159 of the inner wall 123b of this chamber and the surface of the liquid medium contained in the reservoir 121, then into the second enclosure 40 through the conduit 45. The drops which result from condensation of the mist, in contact with the cold surface of the elements of the packing 42 and the wall 40a of the second enclosure, flow under gravity into the conduit 45 then along the portion of the wall 123a which separates this conduit from the reservoir 121, and thus rejoin the latter.

Here again, the reservoir 121 of the first enclosure 120 is therefore supplied continuously with liquid medium both by the drops which are formed on the surface of the liquid medium contained in this reservoir, and by those which are formed in the second enclosure 40.

The various components of the apparatus according to the invention may be made of numerous materials, so long as these materials are on the one hand inert with respect to the elements liable to be extracted from the gaseous medium and capable of withstanding any possible corrosion by these elements and the organic solvents liable to be used as the liquid medium, when they are components required to be in contact with the gaseous medium and the liquid medium and, on the other hand, of withstanding the mechanical stresses to which the said apparatus is liable to be subjected, when they are components which act as supports. It is desirable that these materials should be furthermore have a moderated density so that the apparatus has a weight compatible with being transported and handled by a single person.

For example, the components intended to be in contact with the gaseous medium and the liquid material may be made of polyethylene or polytetrafluoroethylene, whereas the components intended to act as supports may consist of polypropylene or an aluminium-based alloy.

The invention is not limited to the embodiments which have just been explained in detail.

For example, besides the fact that the apparatus may comprise a plurality of condensation enclosures similar to the second enclosure 40 described above, for example mounted in series, in the event that the first enclosure has a condensation dome it may also be provided with means for cooling this condensation zone, and thereby inducing condensation of the mist in the first enclosure both by coalescence and by a thermal effect. This can be particularly useful when the wall of the condensation dome has a low wettability with respect to the liquid medium being used.

The apparatus may also be equipped with a cooling circuit or a drying device (for example a molecular sieve) for desiccating the gaseous medium before it enters the first enclosure, in order to rid it of the water vapour which it contains. The presence of such a system may prove particularly useful in the event that the apparatus is intended to be used at temperatures close to or less than 0° C., in order to prevent ice crystals from obstructing the orifice or orifices of the nebulization nozzle.

Furthermore, the nebulization means are not limited to those used in the examples above, and in principle any devices which can generate micro-droplets of liquid in the presence of a gas may be used in an apparatus according to the invention.

BIBLIOGRAPHY

[1] U.S. Pat. No. 4,208,912
[2] Talbot et al., *Journal of Geophysical Research*, 95, D6, 7553-7561, 1990
[3] Talbot et al., *Journal of Geophysical Research*, 100, D5, 9335-9343, 1995
[4] Keene et al., *Environ. Sci. Technol.*, 27, 866-874, 1993

The invention claimed is:

1. Apparatus for extracting gaseous, liquid and/or solid elements from a gaseous medium and concentrating said elements in a liquid medium, by nebulizing the liquid medium by means of the gaseous medium for producing a mist and condensing the droplets of liquid medium forming the mist produced by the nebulization, said apparatus comprising:

a first enclosure for nebulization and condensation, which has an upper part and a lower part intended to contain the liquid medium, which is provided with a conduit for delivering the gaseous medium into the first enclosure and means for nebulizing the liquid medium, and which is connected to a conduit for discharging the gaseous medium from the first enclosure;

means for depressurizing or pressurizing the interior of the first enclosure to allow the gaseous medium to enter the first enclosure, circulate therein and be discharged therefrom, in a continuous flow;

at least one second enclosure for condensation, this second enclosure being connected to the conduit for discharging the gaseous medium from the first enclosure, and being provided with a conduit for discharging the gaseous medium from the second enclosure;

means for cooling the second enclosure, wherein the conduit for delivering the gaseous medium into the first enclosure has a first end located outside the first enclosure and a second end housed in the first enclosure;

wherein the means for nebulizing comprises:

a nebulization nozzle which is located level with the second end of the conduit and which has at least one orifice; and a nebulization tube provided with a first opening which is located in a lower part of the first opening which is located in a lower part of the first enclosure, and a second opening which is flush with the orifice of the nebulization nozzle; and wherein a connection between the first enclosure and the conduit for discharging the gaseous medium from the first enclosure is located substantially at a same height as the nebulization nozzle, or shifted with regard to the orifice of the nebulization nozzle to the direction opposite to the direction in which the gaseous medium is delivered into the first enclosure.

2. Apparatus according to claim 1, wherein the nebulization nozzle is formed by a reduction in the cross section of the conduit for delivering the gaseous medium into the first enclosure.

3. Apparatus according to claim 1, wherein the nebulization nozzle consists of a piece attached to the second end of the conduit for delivering the gaseous medium into the first enclosure.

4. Apparatus according to claim 1, wherein the orifice of the nebulization nozzle is oriented towards the upper part of the first enclosure, and the second opening of the nebulization tube is located immediately above this orifice.

5. Apparatus according to claim 1, wherein the first enclosure is composed of three parts:

a reservoir which forms the lower part of the first enclosure and which is intended to contain the liquid medium;

a nebulization chamber which forms the intermediate part of the first enclosure and which houses the orifice of the nebulization nozzle and the second opening of the nebulization tube; and a condensation dome which forms the upper part of the first enclosure.

6. Apparatus according to claim 5, wherein the second enclosure having a base and a top, the first conduit for discharging the gaseous medium is a conduit with a bend which connects the nebulization chamber of the first enclosure to the base of the second enclosure.

7. Apparatus according to claim 1, wherein the orifice of the nebulization nozzle is oriented towards the lower part of the first enclosure, and the second opening of the nebulization tube is located immediately below this orifice.

8. Apparatus according to claim 1, wherein the first enclosure is composed of two parts:

a reservoir which forms the lower part of this first enclosure and which is intended to contain the liquid medium, which reservoir has a bottom whose surface area is less than a cross section of this reservoir, this cross section being flush with the surface of the liquid medium when the apparatus is operational; and a nebulization chamber which forms the upper part of the apparatus and which houses the orifice of the nebulization nozzle and the second opening of the nebulization tube.

9. Apparatus according to claim 8, wherein the reservoir has a shape which tapers from the bottom upwards.

10. Apparatus according to claim 8, wherein the nebulization chamber an outer wall onto which the first conduit for discharging the gaseous medium in the first enclosure is to be connected, and an inner wall which is located entirely above and at a distance from the reservoir, the inner wall dividing the nebulization chamber in order to form a central part located inside the inner wall and a peripheral part located between the outer wall and the inner wall, the second opening of the nebulization tube and the orifice of the nebulization nozzle being housed said central part.

11. Apparatus according to claim 8, wherein the second enclosure has a base and a top, and the conduit for discharging the gaseous medium from the first enclosure is a conduit with a bend which connects the nebulization chamber of the first enclosure to the base of the second enclosure.

12. Apparatus according to claim 7, wherein the first enclosure comprises an element for stabilizing the surface of the liquid medium, this element being intended to lie below and at a short distance from this surface when the apparatus is operational, while allowing the drops due to the condensation of the mist to pass though.

13. Apparatus according to claim 1, wherein the means for cooling the second enclosure are a Peltier effect cell.

14. Apparatus according to claim 1, wherein the second enclosure contains packing.

15. Apparatus according to claim 1, wherein the lower part of the first enclosure is provided with at least one system for detecting or quantitatively determining the gaseous, liquid and/or solid elements extracted from the gaseous medium and concentrated in the liquid medium when the apparatus is operational.

16. Apparatus according to claim 1, wherein the lower part of the first enclosure is removable.

17. Apparatus according to claim 1, wherein the first enclosure and the second enclosure can be dismantled, and wherein the constituent parts of the first and second enclosures are connected together in a leaktight fashion when said enclosures are assembled.

18. Apparatus according to claim 1, which comprises means for depressurizing the interior of the first enclosure, which means are a suction pump which is connected to the second conduit for discharging the gaseous medium.

19. Apparatus according to claim 1, which furthermore comprises an electrical power supply system comprising means for connection to an external electrical power source and electrical power supply means for its autonomous operation.

20. Apparatus according to claim 1, which is in the form of a compact structure which can be carried or pulled by a single person.

* * * * *